US005742893A

United States Patent [19]

Frank

[11] Patent Number: 5,742,893

[45] Date of Patent: Apr. 21, 1998

[54] MUSIC-PLAYING SYSTEM FOR A MOTOR VEHICLE

[75] Inventor: Armin Frank, Gutenberg, Germany

[73] Assignee: NSM Aktiengesellschaft, Bingen, Germany

[21] Appl. No.: 640,809

[22] PCT Filed: Nov. 4, 1994

[86] PCT No.: PCT/DE94/01319

§ 371 Date: Jun. 27, 1996

§ 102(e) Date: Jun. 27, 1996

[87] PCT Pub. No.: WO95/12929

PCT Pub. Date: May 11, 1995

[30] Foreign Application Priority Data

Nov. 5, 1993 [DE] Germany .......................... 43 37 726.2

[51] Int. Cl.[6] .......................................... H04B 7/00

[52] U.S. Cl. ........................... 455/66; 455/345; 455/351; 455/6.3

[58] Field of Search .................................. 455/49.1, 53.1, 455/66, 89, 68, 69, 344, 345, 351, 4.1, 4.2, 6.3, 5.1, 500, 550; 364/705.04, 705.05; 379/59; 369/30; 348/12, 13

[56] References Cited

U.S. PATENT DOCUMENTS

| | | | |
|---|---|---|---|
| Re. 34,340 | 8/1993 | Freeman . | |
| 5,161,251 | 11/1992 | Mankovitz | 455/66 |
| 5,181,107 | 1/1993 | Rhoades . | |
| 5,491,838 | 2/1996 | Takahisa et al. | 455/66 |

*Primary Examiner*—Chi H. Pham
*Assistant Examiner*—Gertrude Arthur
*Attorney, Agent, or Firm*—Spencer & Frank

[57] ABSTRACT

A music-playing system for a motor vehicle that is equipped with an antenna includes a radio communications unit in the motor vehicle, an input unit for operating the radio communications unit, and a music-reproduction unit having at least one loudspeaker. One or more external radio communications units are connected via a remote data transmission line to a music storage unit. The radio communications unit in the motor vehicle is designed to receive transmitted music. The operator of the motor vehicle can communicate with the music storage unit and call up pieces of music. An ISDN connection is preferably used as the remote data transmission line.

11 Claims, 2 Drawing Sheets

MUSIC-PLAYING SYSTEM FOR A MOTOR VEHICLE

BACKGROUND OF THE INVENTION

The invention relates to a music-playing system for a motor vehicle provided with an antenna and a receiver, the device encompassing an input unit for operating the receiver, a display connected to the receiver and at least one loudspeaker.

As mobility increases, more and more hours are spent in motor vehicles. Accordingly, requirements placed on the equipment of the vehicle are becoming higher: on the one hand, the time spent in it is to be as pleasant as possible and, on the other hand, time is to be utilized as well as possible. Another objective is to keep costs as low as possible.

Diverse music-playing devices exist for listening to music. As always, car radios offer the widest range of possibilities for receiving and playing pieces of music conventionally transmitted by transmitters. So that passengers can listen independently of broadcast programs, or hear specific pieces if desired, many motor vehicles are alternatively or additionally equipped with cassette players or, in recent times, with CD players. The operation of these devices, however, involves the changing of cassettes or CDs, which can mean undesired disturbances, effort and distraction during driving.

In GB-A-2 185 361 a terminal is described which is designed for professional in-home use, and is connected by an interface to a transmission line via cable or satellite. The information specified for the terminal includes music, but also digital, telefax, telex and videotex information. The terminal has a memory for the received information, a central unit and an output and display unit. The connections to stationary devices are provided in the form of cables or lines, while the connections to mobile devices such as hand displays are realized via radio, e.g. infrared remote transmission. The known terminal is intended to permit the transmission of data at low rates, thus saving transmission costs.

From WO-A-92/01342, a coin-operated jukebox is known which has a coin unit, a display, an input keyboard and at least one loudspeaker. The jukebox is connected via a remote data transmission line to a central music store; the remote data transmission line is suitable for transmitting audio information, and is preferably an ISDN line. Thus, the known jukebox itself does not contain a playback unit with the further corresponding, associated device units, but instead is connected to a central music store and can retrieve the desired information, that is, the selected pieces of music, from this store. Consequently, the equipment costs of the individual jukeboxes is reduced, and the scope of operational and maintenance work is smaller. A supply and an exchange of compact discs in individual jukeboxes are eliminated. This is only a requirement for the central music store, which can contain a considerably larger selection of music pieces than an individual jukebox. Correspondingly, the capacity of the central music store, which is advisably configured as a database, can be utilized better than that of an individual jukebox.

Further proposed in WO-A-92/01342 is the integration of this type of terminal unit into a conventional compact disc playback device, cassette player, television, etc., which can also be set up in private households.

SUMMARY OF THE INVENTION

The object of the invention is to create a music-playing system for motor vehicles which can be operated simply and, at the same time, permits playback of music pieces stored at a fixed location.

A music-playing system of the invention for a motor vehicle provided with an antenna encompasses a receiver, an input unit for operating the receiver, a display connected to the receiver and at least one loudspeaker. Furthermore, the motor vehicle is provided with a central unit and an output unit for transmitting commands and control signals. A music storage unit is provided which is advisably connected by a modem to one or a plurality of transmitters by way of a remote data transmission line suited for transmitting audio information. The receiver of the motor vehicle serves to receive the data transmitted by at least one transmitter, and the output unit of the motor vehicle is provided for communication with the music storage unit and for retrieval of music pieces.

A playback system of the invention thus does not itself include a playback unit having the further corresponding, associated device units; rather, an external music storage unit can be accessed by means of the music-playing system, and the desired information, that is, the selected pieces of music, can be retrieved from the storage unit. With this measure, the equipment costs of the individual music-playing unit are lower, because, with an external music storage unit, only pieces of music or corresponding information carriers need be stored. It also no longer occurs that a musical piece cannot be listened to because the relevant cassette is not brought along.

The solution according to the invention makes greater use of the possibilities offered by remote data transmission, which is being used more frequently, but conventionally only with stationary transmitters and receivers.

The remote data transmission line is preferably an ISDN connection. The use of this type of integrated, digital data transmission technique permits high transmission speeds. The data-reduction methods used in this instance (1-bit reduction methods) further permit the transmission of music of high audio quality.

The music-playing system of the invention can advantageously access a central music storage unit that is preferably a database for pieces of music. This database can correspondingly be integrated into a data-processing system.

In an advantageous, inexpensive embodiment of the music-playing playing system of the invention, the music storage unit is a central depository in the user's home. This permits an individual storage system, and saves possible retrieval costs associated with a commercial database.

The music storage unit advisably includes a store for frequently-played pieces of music that can accordingly be played directly, and more quickly accessed. Different listeners can also access the music storage unit, so that costly data transmission time and occupation of the remote data transmission line can be kept at a minimum.

This setup can be supported by the provision of an intermediate store in the music-playing system in the motor vehicle, in which the audio signals are stored and from which they are sent to the loudspeaker.

A diskette station having diskettes and/or a hard disk and/or a cache memory and/or a CD ROM and/or MD is advantageously used as the storage unit.

In a preferred embodiment of the music-playing system of the invention, the music storage unit includes a playback unit and information carriers for pieces of music that can be played back optically or magnetically. However, magnetic tape cassettes, compact discs, etc., can also be used as storage media.

An advantageous feature that distinguishes the music-playing system is that the playback unit has a changer to change the information carriers. In this way, the playback sequence can be accelerated, and possible pauses between the playback of different information carriers can be shortened.

In a motor vehicle equipped with a car radio, the radio set is preferably the receiver of the motor vehicle. Therefore, no new parts are required, which saves material and installation costs.

Likewise, in a motor vehicle equipped with a car phone, the car phone is advisably used as the receiver in the motor vehicle.

If the motor vehicle has both a car radio and a car phone, the radio loudspeaker is advantageously used as the loudspeaker.

The invention is described in detail below by way of embodiments and the drawing; the illustration and description are not to be seen as limiting, but solely as serving to explain the invention. Illustrated elements, as in the claims, are not limited to the combinations listed there, but can also be used in other combinations with each other.

DESCRIPTION OF THE PREFERRED EMBODIMENT

Figure 1:
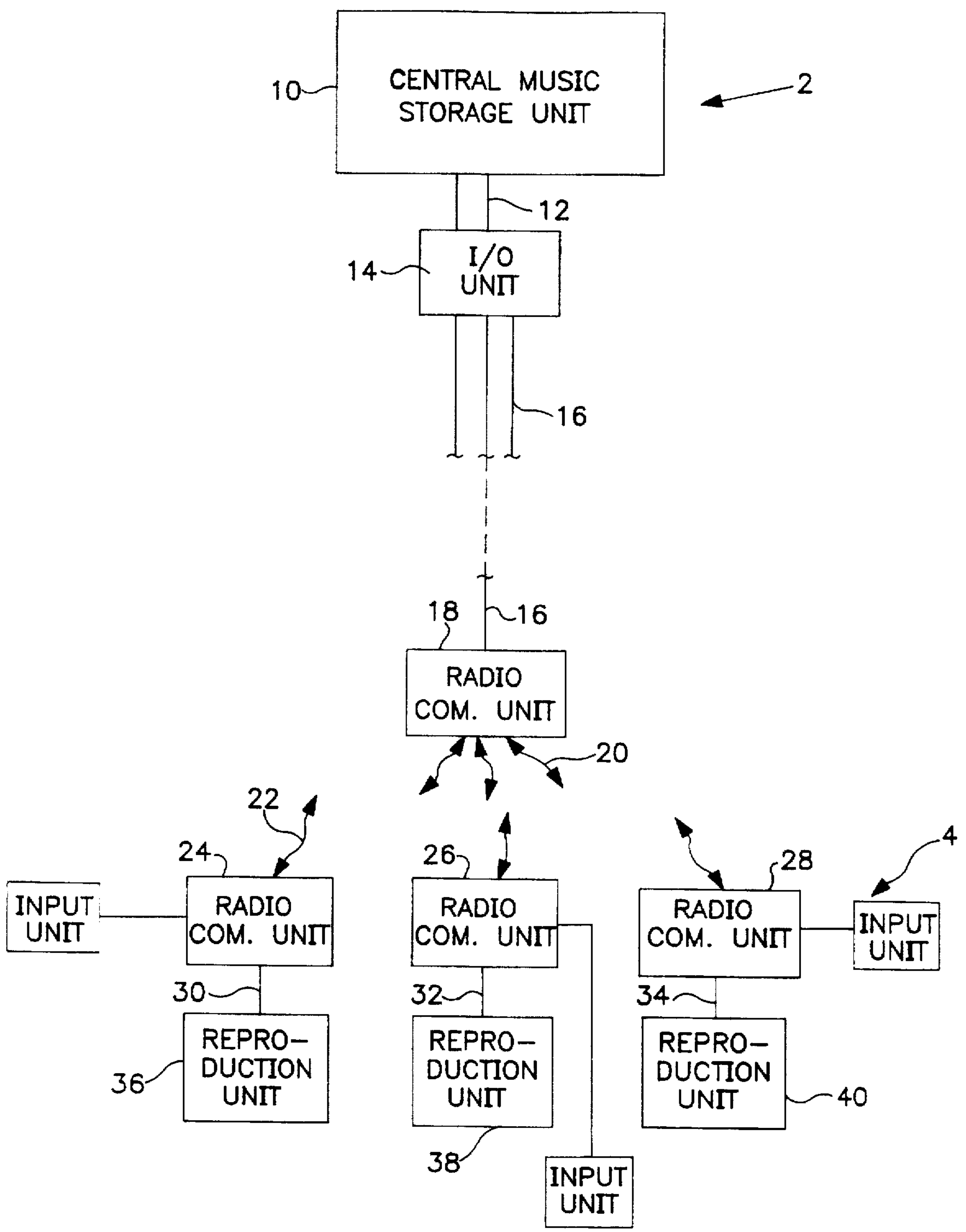
FIG. 1 is a schematic block diagram of a system having a central music storage unit and music-playing devices according to the invention.

The block diagram of FIG. 1 illustrates a system having a central unit 2 and a plurality of music-playing devices 4 which can access the central unit 2.

The central unit 2 encompasses a central music storage unit 10 that can be connected to a computer, not shown. The central storage unit 10 can include a magazine arrangement of compact discs having a playback device or magnetic or optical discs containing stored audio information. The central storage unit 10 is connected via a bus line 12 to an input/output unit 14, which can be equipped with a control unit, a computer, etc., corresponding to the design and configuration of the central storage unit. A plurality of remote data transmission lines 16 is connected to the input/output unit 14; the lines can be ISDN connections, for example.

The remote data transmission lines 16 are connected, either individually or in bundles, to radio communications units 18, which include transmitters to transmit correspondingly converted music data (arrow 20). The corresponding radio communications units 24, 26, 28 (arrow 22) are connected by way of lines 30, 32, 34 to music reproduction units 36, 38, 40 provided in motor vehicles.

The function of the system illustrated in FIG. 1 is as follows. If it is desired to play a specific piece of music by means of one of the music-reproduction units 36, 38, 40, a corresponding control or music selection command is input by way of an input unit and transmitted (arrow 22) to the radio communication unit 18. A receiver in the unit 18 receives these commands (arrow 20) and transmits them by way of the remote data transmission lines 16 to the input/output unit 14 of the central music storage unit 10. There the relevant piece of music is played or retrieved from a data carrier and transmitted in the opposite direction as data signals to the relevant music-playing device 4.

Figure 2:
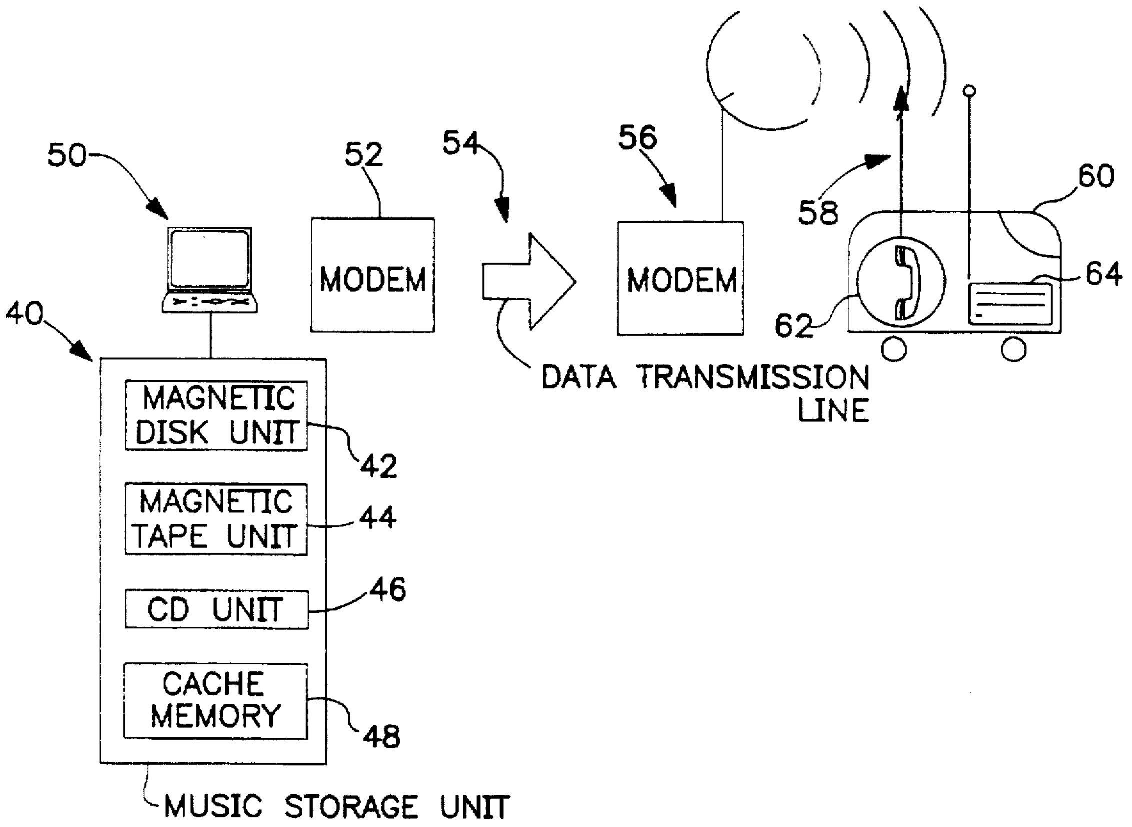
FIG. 2 is a schematic illustration of the design of a music-playing system according to the invention.

A further embodiment of the music-playback system of the invention is illustrated in FIG. 2. In this case the music storage unit 10 is a central depository in the user's home, with a personal computer 50 being provided for access to the music storage unit 10 and the transmission of data. In this example, the music storage unit 10 is a music database which includes a magnetic disk unit 42 (which may be a hard disk unit or a diskette unit), a magnetic tape unit 44, a CD unit 46 (preferably including a changer), and a cache memory 48. Connected to the personal computer 50 is a modem 52, by means of which the music data are transmitted to a radio communications unit 56 by way of a remote data transmission line in the form of an ISDN connection 54. The transmitted data are received by the antenna 58 of a motor vehicle 60 that is equipped with a car telephone 62 and a radio set 64. In the illustrated embodiment, the car phone 62 is used as the car's radio communications unit, and the car's music reproduction unit comprises the radio loudspeaker. The function of this embodiment otherwise corresponds essentially to the function of the embodiment described in conjunction with FIG. 1.

As the above description shows, numerous variations and modifications are possible. An essential point is that, with the invention, centrally-stored music pieces can be retrieved for a motor vehicle and listened to there without necessitating the provision of a playback unit in the motor vehicle.

What is claimed is:

1. A music-playing system for use with a motor vehicle having an antenna, comprising:
   - music storage means for storing musical pieces that can be individually selected, the music storage means being located outside the motor vehicle;
   - first radio communications means for conducting communications by radio, the first radio communications means being disposed outside the motor vehicle;
   - means for connecting the music storage means to the first radio communications means, the means for connecting including a data transmission line;
   - second radio communications means for conducting communications by radio, the second radio communications means being carried by the vehicle and being connected to the antenna for communicating with the first radio communications means;
   - input means, carried by the vehicle and connected to the second radio communications means, for receiving a music selection command from an occupant of the vehicle, the music selection command being conveyed to the music storage means via the second radio communications means, the first radio communication means, and the means for connecting; and
   - music reproduction means, carried by the vehicle and connected to the second radio communications means, for playing back a musical piece that has been retrieved from the music storage means in response to the music selection command, the retrieved musical piece being conveyed to the music reproduction means via the means for connecting, the first radio communications means, and the second radio communications means.

2. A music-playing system according to claim 1, wherein the means for connecting comprises an ISDN connection.

3. A music-playing system according to claim 1, wherein the music storage means comprises a central music storage unit.

4. A music-playing system according to claim 1, wherein the music storage means comprises a database for pieces of music.

5. A music-playing system according to claim 1, wherein the music storage means comprises a depository in the home of the occupant of the vehicle.

6. A music-playing system according to claim 1, wherein the music storage means encompasses a store for frequently-played pieces of music.

7. A music-playing system according to claim 1, wherein the music storage means comprises at least one of a magnetic disk unit, a cache memory, a CD unit, and a magnetic tape unit.

8. A music-playing system according to claim 1, wherein the motor vehicle is equipped with a car radio set, and wherein the music reproduction means comprises at least part of the radio set.

9. A music-playing system according to claim 1, wherein the motor vehicle is equipped with a car phone, and wherein the second radio communications means comprises the car phone.

10. A music-playing system according to claim 9, wherein the motor vehicle is additionally equipped with a car radio set, and wherein the music reproduction means comprises at least part of the car radio set.

11. A music-playing system according to claim 1, wherein the data transmission line comprises a telephone line.

* * * * *